Dec. 29, 1970   R. F. SHANNON   3,551,274
RIGID SHOCK RESISTANT ROOF DECK BOARD MADE OF CELLULAR PELLETS
Filed Feb. 10, 1967   2 Sheets-Sheet 1

INVENTOR.
RICHARD F. SHANNON
BY
*Staelin & Overman*
ATTORNEYS

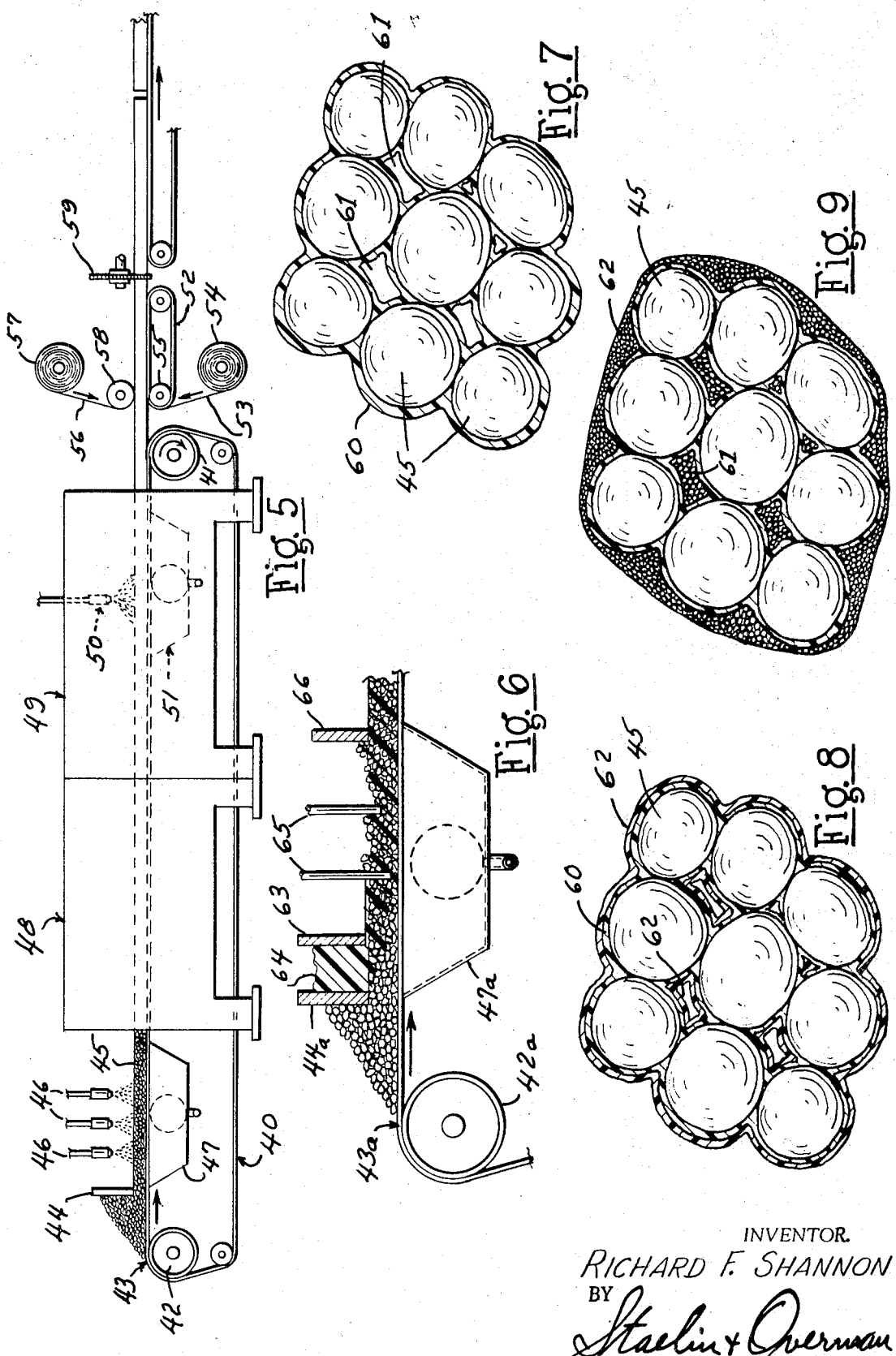

United States Patent Office 3,551,274
Patented Dec. 29, 1970

3,551,274
RIGID SHOCK RESISTANT ROOF DECK BOARD MADE OF CELLULAR PELLETS
Richard F. Shannon, Lancaster, Ohio, assignor to Owens-Corning Fiberglas Corporation, a corporation of Delaware
Continuation-in-part of application Ser. No. 378,216, June 26, 1964. This application Feb. 10, 1967, Ser. No. 615,227
Int. Cl. B32b 5/18; C03c 17/32, 11/00
U.S. Cl. 161—168  8 Claims

ABSTRACT OF THE DISCLOSURE

A composite, and method of making the same, wherein cellular inorganic pellets are bonded together with a thin coating of a binder which leaves interconnected interstitial voids between the coated pellets, which voids are impregnated with a plastic shock absorbent material that greatly reduces the brittle nature of the composite. The rigid shock resistant composite may be made of glass or clay cellular pellets, an organic or inorganic binder, and resilient or plastic shock absorbing materials such as bituminous materials, waxes, or various organic resin foams.

CROSS REFERENCES TO RELATED APPLICATIONS

The present application is a continuation-in-part of my copending application, Ser. No. 378,216, filed June 26, 1964, now abandoned.

BACKGROUND OF THE INVENTION

The present invention relates to light weight composites of the type wherein cellular inorganic pellets are held together into a structural material by a binder; and more particularly to composites suitable for use as light weight structural roof insulation and the like.

It has been known heretofore to use light weight inorganic pellets as an aggregate in various cementitious materials. In prior art materials, the cementitious material forms a continuous matrix, and the pellets act primarily as a filler which cheapens the material. Where a solid binder is used between pellets, the properties of the composites are determined largely by the cementitious materials, and pellets of a brittle nature do not necessarily make the composite brittle.

The present invention relates to composites of cellular inorganic pellets and cementitious materials, wherein the cementitious materials between pellets is not solid and does not fill the area between the pellets. The materials of the present invention are lighter than prior art composites because of voids in the binder material between pellets. Inorganic cements, such as portland cement, gypsum, etc., and thermoset organic resins are brittle, and although strong in compression, are weak in bending. The type of composites with which we are concerned are extremely brittle if not further treated in a manner later to be described.

SUMMARY

The present invention relates to extremely light weight composites using cellular pellets bound together by a binder, which binder in turn is broken up by interstitial voids. The composites of the present invention are made shatter resistant by reason of a plastic shock absorbent material that impregnates the voids in the binder. In addition, the invention relates to a process for making the composites quickly and inexpensively.

An object of the invention is the provision of a new and improved light weight material suitable for use as a structural roof insulation and the like having a weight of less than approximately 12 pounds per cubic foot, which will withstand temperatures of 300° F. and more, and which is not brittle.

A further object of the invention is the provision of a new and improved process of making light weight structural composites of the above mentioned type in a continuous, inexpensive manner.

Further objects and advantages of the invention will become apparent to those skilled in the art to which it relates from the following description of several preferred embodiments described with reference to the accompanying drawings forming a part of this specification.

BRIEF DESCRIPTION OF THE DRAWING

FIG. 5 is a schematic view of apparatus for performing the method of the present invention;

FIG. 6 is a fragmentary schematic view similar to FIG. 5, but showing another embodiment of apparatus;

FIG. 7 is a fragmentary enlarged view of the structure produced by the apparatus of FIG. 5 before impregnation;

FIG. 8 is a fragmentary enlarged view similar to FIG. 7 but showing a plastic shock absorbing material in the interstitial voids of the structure shown in FIG. 7; and FIG. 9 is a fragmentary enlarged view of the structure shown in FIG. 7 but wherein the interstitial voids are filled by a plastic shock absorbent cellular foam material.

DESCRIPTION OF THE PREFERRED EMBODIMENTS

The pellets used in the present invention contain voids therein and may either be a single cell in the form of a hollow sphere or may be multi-celled as will later be described in detail. Single celled pellets may be made of any suitable material, as for example clay, glass, etc. suitable examples of which are described in the Veatch et al. U.S. Pat. 2,797,201 or U.S. Pats. 1,995,803; 2,151,083; and 2,676,892. Multi-celled glass pellets are particularly desirable and a process of making the same will now be described in detail.

Figure 1:
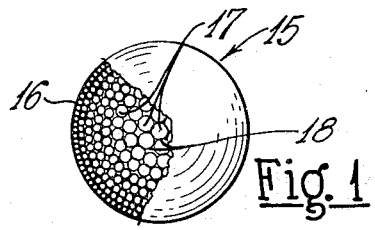
FIG. 1 is an idealized plan view of a glass foam pellet having substantially continuous, impervious exterior region, with a portion of the pellet broken away to show details of the structure.

Referring now in more detail to the drawings and, in particular to FIG. 1, a pellet which is particularly useful in producing articles according to the invention is designated generally at 15. The pellet 15 comprises a substantially, impervious skin 16 and a plurality of cells 17, each of which is defined by a thin wall 18 of the same material as the skin 16.

Figure 2:
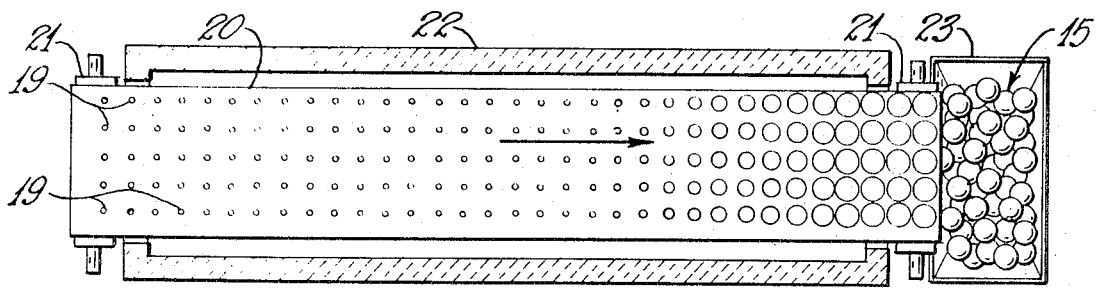
FIG. 2 is a plan view, with parts broken away to show details of construction, of a furnace in which the pellets of FIG. 1 can be produced.

The pellet 15 can conveniently be produced by depositing foamable bodies 19 on a conveyor belt 20 carried by rolls 21, one of which is driven in any suitable manner (not illustrated) to advance the belt 20 in the direction indicated by the arrow in FIG. 2. The foamable bodies 19 are advanced by the belt 20 into a furnace enclosed by walls 22, and heated in any suitable manner (not illustrated) to cause drying of the foamable bodies 19 and then foaming, expansion and formation of the substantially continuous, impervious skin, so that the pellets 15 are discharged from the righthand end of the belt 20 into a hopper 23.

It will be noted in FIG. 1 that the cells 17 in the interior of the pellet 15 are shown as larger in size than those adjacent the skin 16. This has been found experimentally to be the actual fact, and is believed to be caused by shrinkage of the exterior portion during heating to produce the pellet 15 as described above. It will be appreciated that such heating must be to a temperature sufficiently high to cause at least incipient fusion of the surface portion, so that contraction can reasonably be expected. It will also be noted that the pellet 15 is represented as being regular in configuration, and spherical in overall shape. This is not necessarily the situation, and, in fact, would seldom occur in actual practice, since the heating to cause foaming of the bodies 19 in the furnace of FIG. 2, for example, is not to a temperature sufficiently high for surface tension to cause contraction to the minimum volume spherical shape, and, additionally, because the bodies are not free floating during this heating. In fact, it is often desirable to deform the pellets to provide particular required shapes. The walls 18 are also represented as being continuous. This is highly advantageous in some situations, e.g., when the pellets are to be used in making thermal insulating structures. However, broken walls 18 are advantageous in other situations, e.g, when the pellets are to be used in acoustical insulating structures. Both types of pellets can be provided, and are contemplated hereby.

Figure 3:
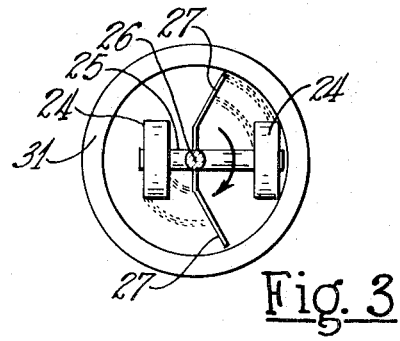
FIG. 3 is a plan view of a muller which can be used to produce pellets which constitute a charging material for the furnace of FIG. 2.
Figure 4:
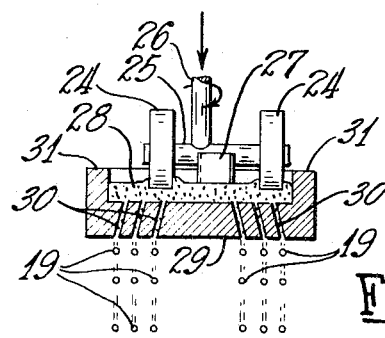
FIG. 4 is a vertical sectional view of the muller of FIG. 3.

The foamable bodies 19 can conveniently be prepared in apparatus which is shown in FIGS. 3 and 4, and which comprises two wheel members 24, each of which is journaled to a shaft 25, which is carried by a drive shaft 26 mounted in any suitable manner (not illustrated) for rotation in the directions indicated by the arrows in FIGS. 3 and 4. A scraper blade 27 is welded or otherwise rigidly attached to the shaft 25 for rotation therewith. A foamable composition 28 is carried by a plate member 29 through which orifices 30 are provided, and which has integral, upwardly extending side walls 31 to confine the foamable material 28 laterally. As the drive shaft 26 is rotated it is also urged downwardly in the direction of the arrow in FIG. 4 so that it causes working of the foamable composition on the plate member 29 and through the orifices 30 so that foamable bodies 19 are extruded from the orifices 30. Other types of available pelletizing apparatus can also be used to produce the bodies 19.

The foamable composition 28 in the apparatus of FIGS. 3 and 4 can conveniently consist of 100 parts[1] of a glass A[2], 0.5 part of aluminum flake, 1.5 parts of anhydrous calcium sulfate and 1.5 parts of barium sulfate. All of the constituents of the foamable composition are in a powdered form, all finer than about 50 mesh, U.S. Sieve Series, and substantially all being finer than 200 mesh, the aluminum flake being minus 325 mesh in its entirety. It will be noted that this composition is principally glass. This is an important consideration, because the glass is of uniform, consistent quality, so that the bodies 15 (FIG. 1) which are produced therefrom are also of uniform, consistent quality. It has been found that glass pellets are unexpectedly effective, by comparison with previously known pellets, at improving the thermal insulating properties of binders with which they are used. The fineness of the cells of the glass foam pellets is an important factor in achieving the improved properties. It will be appreciated that the calcium sulfate and the barium sulfate are used merely as blowing agents,

[1] The terms "percent" and "parts" are used herein and in the appended claims to refer to percent and parts by weight, unless otherwise indicated.
[2] Glass A has substantially the following chemical analysis, in percent:
$SiO_2$ ---- 54.6
$Al_2O_3$ ---- 14.3
$CaO$ ---- 17.4
$MgO$ ---- 4.8
$B_2O_3$ ---- 7.5
and less than ½ percent of each of the following:
$F_2$
$R_2O$ ($Na_2O$, $K_2O$)
$Fe_2O_3$
$TiO_2$
$ZnO$ and are useful because they release gases at a temperature range in which the particular glass identified above has viscosity characteristics suitable for cellulation or foaming. The aluminum apparently acts as a nucleating agent. Very fine powders of other materials which do not melt at the softening temperature of the glass, can also be used as nucleating agents. Suitable examples are −325 mesh powders of titanium dioxide, zircon and chromium oxide. The fine particles of non-melting material act as seeds about which the blowing gases accumulate to produce an extremely large number of small gas bubbles. It will also be appreciated that various other glasses could be used in place of Glass A, and with the same blowing agents if those glasses have the same high temperature viscosity characteristics as Glass A, or with a different blowing agent or blowing agent composition if, as is more likely to be the situation, the high temperature viscosity characteristics are significantly different. In this instance, as is true in the formulation presented above, the blowing agent or blowing agent composition would be required to be one which released gases over a temperature range at which the glass had the required viscosity characteristics. For example, foams have been produced from finely ground soda lime glass and 1/10 percent of 1,000 mesh silicon carbide plus ¾ percent of sodium carbonate, and it is believed that increasing the percentages of both the silicon carbide and the sodium carbonate by as much as 50 percent would improve the properties of the pellets. Pellets 15 can be produced from the foamable composition identified above, in the apparatus of FIG. 2, by controlling the heating of the furnace defined by the walls 22 and the drive rate of the belt 20 so that the foamable bodies 19 are heated to about 1,900° F. during passage through the furnace. The glass pellets which are produced using a sulfate salt as a blowing agent are filled with sulfur dioxide gas which is objectionable in some instances. The odor of the pellets can be reduced by treating the pellets with a resin containing activated carbon. In some instances, the sulfur dioxide gas in the pellets may cause a corrosion problem and this can be greatly reduced by coating the pellets with paraffin wax. It has also been found that the pellets can be made stronger, and less pervious to water by coating with a resin containing a silicone. With some compositions of glass, it is possible to use powdered zinc or metallic mercury as a blowing agent. The glasses which are used with these metallic blowing agents must have softening points below the vaporization point of the metal. Mixtures of the powdered glass and metal are heated together to cause a softening of the glass; a subsequent increase in temperature then causes the metals to vaporize to cause a foaming of the glass.

In some instances, it may be desirable to improve the heat resistance of the foamed glass pellets that are produced by any of the above-suggested methods. This can be done by reheating the glass foam pellets to cause a partial recrystallization, or devitrification. The devitrification process can be aided by applying a thin coating of at least one metallic salt to the pellets before refiring. The coating of metallic salts can be applied in any suitable manner, as by spraying the pellets with a water solution of the metallic salts and evaporating the water. In some instances, it may be desirable to produce glass pellets having a surface that is high in silica. This can be accomplished by treating the pellets with hydrochloric acid to leach out the alkali materials of the glass.

The foamed glass pellets can also be prepared by pouring the foamable glass composition above described into a monolithic layer which is then heated in a furnace to 1950° F. for about 12 minutes and cooled in ambient air. This cellular material is broken up into particles ranging from about 1/32 inch to about ¾ of an inch in size, and these fragments can then be passed through a furnace similar to the furnace 22 where their surface is fused to provide the impervious skin. In general, the pellets range from approximately 1/16 inch diameter to 1/2 inch diameter and are preferably from 3/32 inch to 5/16 inch in diameter.

The cellular pellets can be formed into the composites of the present invention in various ways, a preferred method of which is shown in FIG. 5. In the process shown in FIG. 5, cellular pellets, as for example those produced in accordance with the apparatus shown in FIG. 2 are deposited on the top flight of an endless screen conveyor 40 having a head pulley 41 and tail pulley 42. Immediately after being deposited on the top flight 43, the pellets are leveled as by a scraper blade 44, and immediately thereafter a binder material is applied to the top surface of the layer 45 of pellets. The binder may be of any suitable type, and as shown in the drawing, is an aqueous emulsion of a phenolic resin, either of the Novolac type described in the parent application but devoid of a foaming agent, or a resole also described. The emulsion can be applied either by a doctor blade, not shown, or by means of a spray header 46, and the binder material is caused to flow down around the pellets by means of vacuum applied to a pan 47 which closely fits the bottom of the top flight 43 of the conveyor 40. The vacuum not only pulls the binder material quickly through the bed of pellets, but insures that air is drawn through the pellets to provide connecting interstitial voids in the binder between the pellets.

A preferred binder material is made by charging 94 pounds of phenol, 202 pounds of 37 percent Formalin, and 10 pounds of barium hydroxide (Ba(OH)$_2$) into a 25 gallon reaction vessel and cooking the charge for a total of 13 hours during which time it is stirred by a propeller type agitator. The charge is heated to 110° F., and maintained at about such temperature for approximately 3 hours, heated to and held at approximately 125° F. for an additional four hours, and then heated to and held at about 140° F. for the remaining six hours. The reaction products which are produced constitute an aqueous alkaline dispersion of a resole, and had a solids content of 45.92 percent, a pH of 8.65 and a free formaldehyde content, based upon total resin solids, of 6.5 percent. A 19 pound portion of 30 percent sulfuric acid is then added to the resole to lower the pH thereof to 7, and to precipitate barium sulfate.

A mixing tank provided with a propeller-type agitator is charged with 11 gallons of water, and the water and subsequently charged ingredients are stirred during the formulation of a binder composition from the resole dispersion produced as described in the preceding paragraph. A 7 gallon portion of the resole dispersion is then added, followed by a 2.1 gallon portion of a pine wood pitch extract,[3] 1 quart of 28 percent ammonium hydroxide, 1/3 gallon of mineral oil emulsified with stearic acid and ammonium carbonate and 2½ ounces of ammonium sulfate dissolved in 5 ounces of water. Agitation is continued for 5 minutes after the ammonium sulfate addition to assure substantial uniformity of the complete binder composition.

The binder composition is sprayed by the header 46 onto the cellular pellets 45 using an excess over that required to fully coat the pellets, which excess is pulled into the pan 47 and pumped back to the spray header by a pump not shown. The top flight 43 of the conveyor thereafter moves the coated pellets to the drying section 48 of a curing oven 49 which evaporates the free water. The pellets are thereafter moved into a section of the curing oven maintained at approximately 400° F. and through which the conveyor moves the pellets in approximately 5 minutes. Adjacent the end of the curing oven 49 is a plastic shock absorbent applicator which in the present instance is a hot asphalt spray header 50 that is positioned over a vacuum pan 51 which closely engages the bottom of the top flight 43 of the conveyor. The differential pressure produced by vacuum in the pan 51 causes the hot asphalt to be forced by differential pressure through the voids of the binder material. The hot asphalt is preferably provided in an excess of that required to completely impregnate the voids, and any excess beyond that required to coat the surface of the voids is collected in the pan 51 and is pumped back to the hot asphalt spray header 50. The curing of the resin in the curing oven rigidifies the pellets into a slab structure which is then transferred to the top flight of a short endless belt 52. A sheet of paper 53 is uncoiled from a roll 54 and is caused to pass around the tail pulley 55 of the short conveyor 52. The slab structure from the conveyor 40 is caused to rest on the paper 53, and a second sheet of paper 56 is uncoiled from a roll 57 and is caused to pass around a pressure roll 58 which forces the sheet of paper 56 into engagement with the top surface of the slab. The bottom sheet of paper 53 is wider than the slab structure, and the side edges thereof are folded up over the side edges of the slab so that the slab structure is completely encased in paper. The slab structure is then cut transversely by a revolving saw 59 into sections of approximately 6 feet in length following which they pass to an unloading zone for removal to storage.

An enlarged fragmentary view of the structure produced by the apparatus shown in FIG. 5 is shown in FIG. 7. The pellets 45 are coated by a thin film of the binder material 60 of a thickness less than approximately 1/10 the diameter of the pellet which pellets are preferably in touching engagement. The binder material 60 cements the pellets 45 together in a manner leaving connected interstitial voids 61 which in the final product is at least partially filled with a plastic shock absorbent material 62 shown in FIGS. 8 and 9. The shock absorbent material 62 may not in all instances completely fill the voids 61, but should coat the side walls of the pellets surrounding the voids 61 at least in the areas where the pellets are bonded together. Slabs of the materials produced by the apparatus shown in FIG. 5 and impregnated with asphalt as shown in FIG. 8 can be stood on end and allowed to fall repeatedly without breaking. The slabs can be exposed to temperatures of 400° F. for extended periods of time without any appreciable reduction in strength. When asphalt or other flame resistant impregnant is used, the slabs are flame resistant to the extent that they only smolder following prolonged direct exposure to a flame. In some instances, it will also be possible to apply a partially cured phenolic resin binder in a molten state, with or without using an organic solvent.

A composite having desirable properties can also be produced by troweling a plastic mix on top of the layer of pellets, (see FIG. 6) and sucking the plastic mix over the pellets by means of differential pressure produced by the vacuum pan 47a. The plastic mix can be applied to the top of the surface of the pellets following the doctor blade 44a, following which a uniform coverage of the plastic mix is provided by another doctor blade 63. This can be accomplished by the apparatus shown in FIG. 6. Those portions of FIG. 6 which correspond to similar portions of FIG. 5 are designated by a like reference numeral characterized further in that a subscript *a* is affixed thereto. In the embodiment shown in FIG. 6, the plastic mix 64 is troweled to a uniform thickness by the doctor blade 63 following which fingers 65 spaced approximately 2 inches apart project down into the bed of pellets to move the plastic cement and pellets relative to

---

[3] The extract used is resinous in nature and has the following analysis:
   6 percent high melting furfural condensate (methanol insoluble).
   4 percent neutral oils (hydrocarbons, esters and ethers).
   9 percent rosin.
   5 percent belro-phenol-lactone (probably $C_{15}H_{14}O_3.2(OCH_3OH)$).
   5 percent flavone type polyphenol (possibly about $C_{15}H_7O_2.3OH$).
   2 percent fumic acid type compound.
   0.2 percent pectic acid type compound.
   6 percent air oxidized rosin acid (unfused).
   3 percent strongly acidic compound.
   38 percent weakly acidic, high melting phenolic compound.
   19 percent relatively neutral phenol ethers and esters.
   1 percent water soluble carbohydrates, etc.

each other while the plastic binder is being forced into the bed by the differential pressure. This relative movement insures the presence of binder material in the regions where the pellets most closely approach each other. The top surface of the pellets is then leveled by a scraper 66, pressure roll or other device which compacts the pellets into generally touching engagement.

Alternatively, the material from FIG. 2 can be tumbled in a cylindrical mixer to which the plastic mix is delivered to thoroughly coat the pellets prior to the time that they are applied to the conveyor 43a shown in FIG. 6.

An example of a plastic mix which produces good composites are the oxycements and particularly magnesium oxysulfate, magnesium oxychloride, and magnesium oxyphosphate. The cements are heat settable and not only set quickly when subjected to heat, but also lend themselves to high speed curing processes. Thin films of magnesium oxysulphate cement can be cured in one minute at a temperature as low as 170° F. Aluminite and magnesium oxychloride cements are neutral and are a satisfactory binder for glass pellets.

Very good results can be obtained by using a cement slurry composed of 100 parts by weight of calcined magnesium oxide, 200 parts by weight of a 30 weight percent solution of $MgSO_4 \cdot 7H_2O$, 200 parts by weight of potters flint, and 300 parts by weight of 80 mesh sand. This composition produces an extremely hard cement which shows no tendency to crack or craze upon drying, and in order to obtain maximum wet strength, the ratio of the calcined magnesium oxide to $MgSO_4 \cdot 7H_2O$ should be held to a 10 to 1 mol ratio (1.66:1 on a weight basis). When this type of binder is used, the curing oven can be run at a temperature of approximately 300° F.

Another type of binder which can be used are the gypsum materials. In particular the "neutral gypsums" are to be preferred. The term "neutral gypsum" is used herein in its recognized sense to refer to gypsum which is not highly alkaline, i.e. has a pH from about 7 to about 10. A neutral gypsum preferably has a compressive strength of at least 3,500 pounds per square inch, a hardness of at least 80, and a maximum setting expansion of 0.003 inch per inch of product.

Calcined gypsum, which is obtained by heating raw gypsum to drive off most of the water of crystallization to form a gypsum hemihydrate, $CaSO_4 \cdot \frac{1}{2}H_2O$ is a satisfactory cement. This gypsum hemihydrate can combine readily with water, and the mechanism of setting is such that 18.6 pounds of water are required to convert 100 pounds of gypsum hemihydrate to the insoluble dihydrate, calcium sulfate, $CaSO_4 \cdot 2H_2O$.

An important factor in mixing the gypsum slurry is the use of "normal consistency" ratios. "Normal consistency" is defined as a number of parts of water, by weight, at a definite temperature, that is required to produce the slurry fluid when mixed with 100 parts of calcined gypsum, by weight, in the specified manner. It is possible to vary the compressive strength of alpha gypsum from 1,000 p.s.i. to 11,000 p.s.i. by changing only "normal consistency"; the more water used in mixing, the weaker the set mass. Density, hardness, strength, resistance to abrasion, and water absorption are all intimately related to the quantity of water used in the mix.

Exceptionally good results are obtained when the cement is made from a gypsum slurry produced from "Industrial White Hydrocal," a product of the United States Gypsum Co. having a "normal consistency" between 38 to 42. This gypsum is not only a neutral gypsum, but also sets to a high strength dihydrate. "Hydrostone," another high strength gypsum of the United States Gypsum Co. which is stronger than the "Industrial White Hydrocal," can be used to produce very strong slabs when made in a slurry having a "normal consistency" prepared by mixing 100 parts by weight of "Hydrostone," with 34 parts by weight of water. However, the "Hydrostone" gypsum has a rather high pH value and this alkalinity makes the use of "Hydrostone" cement under moist conditions undesirable in some instances when used in conjunction with glass foam pellets.

The same type of equipment used to coat the pellets with plastic mixes can also be used to coat the pellets with silica sols and water glasses, as for example a sodium silicate having a silica to soda ratio of approximately 3.25 to 1.

Another preferred material is prepared using commercial hollow clay pellets and a sodium silicate binder. Commercially obtainable hollow clay spheres of approximately $\frac{1}{16}$ to $\frac{1}{8}$ inch in diameter and having a bulk density of 13 to 15 pounds per cubic foot are distributed on the conveyor 43a (FIG. 6) following which a uniform coverage of a sodium silicate solution containing 40 percent solids and having a silica to soda ratio of 3.22 to 1 is applied as at 64. A greater than sufficient amount of the sodium silicate required to coat the surface of the pellets is used, and the excess is drawn into the vacuum pan 47a and recirculated. The top of the coated pellets is smoothened by the doctor plate 66 following which a roller, not shown, compacts the pellets and these compacted pellets then proceed to the oven 48, operated at a temperature of approximately 300° F. to dry and harden the sodium silicate. Thereafter, the hardened composite is impregnated with asphalt as by the spray header 50, which asphalt is sucked down through the interstices by the differential pressure produced by the vacuum pan 51, and the excess asphalt is recirculated. The asphalt preferably has a melting point of approximately 200° F. and is cut back with approximately 10 percent of a high boiling kerosene. This procedure does not completely fill the interstitial voids, but coats the surfaces thereof to produce a structure similar to that shown in FIG. 8. The structure so provided not only has appreciable strength at elevated temperatures, but is flame resistant in that it only smolders after direct exposure to a flame.

The hollow clay beads above referred to are produced in a drying tower by spraying a slurry of clay and a vaporizable solvent into the top of a drying tower, and allowing the droplets to fall through a rising flow of hot air.

Another suitable binder material which can be used with the clay beads or the glass pellets is a phenolic resin resole made by cooking 94 pounds of phenol with 138 pounds of a 50 percent water solution of formaldehyde and 5 pounds of sodium hydroxide for three hours at 110° F. followed by cooking for an additional four hours at 140° F. This material will have a solids content of 70.9 percent by weight, and can be applied to the pellets at room temperature using the procedures outlined above. When pellets coated with this material are heated by the oven to a temperature of approximately 300° F. for ten minutes, the resole hardens into an excellent binder.

It is believed that the unexpected strength of the products of the invention occurs through a phenomenon whereby the asphalt absorbs shock waves to prevent force concentration at points removed from the point of impact. When the impregnated material is dropped upon concrete, the damage is limited to crushing in the region of impact, and because the pellets have relatively high compressive strength, the amount of crushing that occurs is negligible. The plastic shock absorbing impregnating material should coat pellets adjacent the area of bond in a manner bridging the pellets since this is the area where shock waves and other forces concentrate. The plastic shock absorbent material, therefore, strengthens the bonded pellets, not by reason of the strength which the asphalt or other plastic shock absorbing material imparts, but because of a unique cooperation wherein a second material having a radically different modulus of elasticity changes the apparent modulus of the resulting bonded pellet body. Because the resulting body no longer has a high and uniform modulus, it is "detuned" relative to shock waves, so that they no longer produce a stress concentration.

The voids between the pellets need not be completely filled with the shock absorbing material, nor is the manner in which the shock absorbing material is applied to the pellets critical. For example, a body of bonded pellets can be placed into hot asphalt so that at least one surface is completely coated with asphalt. Thereafter, the body may be placed in an oven with the asphalt coated surface facing upwardly and the block allowed to remain in the heated oven at a temperature from 25 to 50° F. above the softening point of the asphalt to allow the asphalt to drain down through the interstices. The amount of asphalt which is allowed to remain is not critical so long as the surface of the interstices is coated in the region of contact between the pellets. As for example, a body of pellets having a density of from 4 to 15 pounds per cubic foot will have satisfactory strength when impregnated with asphalt to produce a body of bonded pellets having an apparent density ranging from approximately 7 to 20 pounds per cubic foot. It has been found that the composition of the asphalt which is used is not particularly critical, but those having low viscosities, low tackiness, and softening points can be used at lower temperatures and will penetrate faster than those which are tacky and have high viscosities.

The amazing properties produced by impregnation of the foamed glass body with bituminous materials such as a tar, pitch, asphalt, etc. can be produced by any resilient or plastic shock absorbent material. Waxes, such as paraffin wax and especially high melting waxes can be used. In addition, a suitable foamed or cellular organic resinous material produces excellent results. The foam material can be a phenolic foam, which can be of the resole type suggested in U.S. Pat. 2,979,469 of the Novolac type, for example as suggested in U.S. Pat. 2,993,871, of the ureaformaldehyde-, polyurethane-, polystyrene-, epoxy-, or polyester-type.

By way of example, the slab of bonded glass pellets produced as above described using a phenolformaldehyde binder may be placed upon a foamable Novolac resin of the type described in Pat. 2,993,871 using approximately 100 grams of the foamable Novolac resin per square foot of a 2 inch thick slab. The slab is held down upon the foamable resin by a foraminous pressure plate, and the slab and resin heated to a temperature of 330 to 360° F. for ten minutes. The foamable resin expands up through the interstices of the slab to provide the desired shock resistant material of the present invention.

By way of another example, the bonded pellet slab produced as above described may be dipped into an alcohol solution of a phenoilc foamable resin mixture having the following composition: 77 parts of a Novolac resin of the type disclosed in Pat. 2,993,871, 16 parts of hexamethylene tetramine, 2 parts of Unicel ND, 2 parts of X-520 silicone, and 40 parts of methyl alcohol. Approximately 160 grams of the solution remain in each square foot of a 2 inch thick slab and the slab is thereafter dried to remove excess alcohol and leave the resin solids dispersed throughout the interstitial voids. Thereafter, the slab is heated to a temperature of approximately 330 to 350° F. in any suitable manner for approximately ten minutes to foam the resin and completely fill the voids. It will be apparent that the phenolic foam has a modulus of elasticity very much different from that of the glass, and that the impregnating material does not transmit shock waves readily, and prevents the propagation of the shock waves through the slab.

The interstices can also be filled with a foamed asphalt or with any thermoplastic or thermosetting resin either in a solid form or in a foamed state; and it will be understood that the foamed resins, and asphalt are the preferred shock absorbing materials.

It will be apparent that there has been provided a new and improved light weight composite having improved strength and other properties, and which can be produced more inexpensively than the light weight composites produced heretofore.

While the invention has been described in considerable detail, I do not wish to be limited to the particular embodiments shown and described, and it is my intention to cover hereby all novel adaptations, modifications, and arrangements thereof which come within the practice of those skilled in the art to which the invention relates.

I claim:

1. A rigid shock resistant roof deck board and the like consisting essentially of pellets, binder and a plastic shock absorbing material comprising: a plurality of cellular pellets from the group consisting of clay pellets and glass pellets having a size of from approximately $\frac{1}{16}''$ to approximately $\frac{3}{4}''$, said pellets having a thin coating of a binder thereon of a thickness less than $\frac{1}{10}$ the diameter of the pellets, the binder of said pellets being hardened while said coated pellets are in generally touching engagement to form a body having an apparent density from approximately 4 pounds per cubic foot to approximately 15 pounds per cubic foot while providing connecting interstitial voids, and a plastic shock absorbing material from the group consisting of bituminous materials, waxes, phenolic foams, ureaformaldehyde foams, polyurethane foams, polystyrene foams, epoxy foams, and polyester foams filling said voids.

2. The rigid shock resistant board of claim 1 wherein said pellets are a glass foam.

3. The rigid shock resistant board of claim 1 wherein said binder is a phenolic resin.

4. The rigid shock resistant board of claim 1 wherein said binder is the dried residue of a soluble silicate.

5. The rigid shock resistant board of claim 1 wherein said binder is gypsum.

6. The rigid shock resistant board of claim 1 wherein said binder is a magnesium oxy cement.

7. The rigid shock resistant board of claim 1 wherein the binder is a phenolformaldehyde resin, and the shock absorbing material is one of said foams.

8. The rigid shock resistant board of claim 1 wherein the pellets are hollow clay beads, the binder is a sodium silicate, and the plastic shock absorbing material is asphalt.

References Cited

UNITED STATES PATENTS

| 3,373,074 | 3/1968 | D'eustachio et al. | 161—202X |
| 3,166,615 | 1/1965 | Farrell | 264—123 |
| 2,797,201 | 6/1957 | Veatch et al. | 161—Porous Dig. |
| 2,806,509 | 9/1957 | Bozzacco et al. | 161—161 |
| 3,050,427 | 8/1962 | Slayter et al. | 156—78 |
| 3,070,474 | 12/1962 | Smith | 161—162 |

WILLIAM J. VAN BALEN, Primary Examiner

W. W. SCHWARZE, Assistant Examiner

U.S. Cl. X.R.

65—9, 18; 106—54; 117—72, 124; 161—202; 264—46, 48